United States Patent [19]

Kljucaricek

[11] 4,023,090
[45] May 10, 1977

[54] ZAGREB ELECTRICAL CIRCUIT

[76] Inventor: Peter Kljucaricek, 14753 Bade, Warren, Mich. 48093

[22] Filed: July 6, 1976

[21] Appl. No.: 703,075

[52] U.S. Cl. .......................... 323/47; 323/43.5 R; 323/48; 323/83; 323/91; 336/147; 336/148
[51] Int. Cl.² ...................................... H01F 29/02
[58] Field of Search ............ 323/43.5 R, 45, 44 R, 323/47, 48, 49, 82, 91, 83; 336/115, 116, 137, 145, 146, 147, 148, 150

[56] References Cited

UNITED STATES PATENTS

| 2,560,385 | 7/1951 | Dessarzin | 323/45 |
| 3,014,173 | 12/1961 | Martin et al. | 323/45 |
| 3,374,426 | 3/1968 | Bedil | 323/45 |
| 3,652,925 | 3/1972 | Yamana | 323/47 |
| 3,690,739 | 9/1972 | Prescott | 323/43.5 R |
| 3,978,395 | 8/1976 | Legnaioli | 323/43.5 R |

FOREIGN PATENTS OR APPLICATIONS 484,683  10/1929  Germany ............................. 323/45

Primary Examiner—Gerald Goldberg
Attorney, Agent, or Firm—William L. Fisher

[57] ABSTRACT

In an electrical three phase variable power supply fed by three phase alternating power and having a three coil adjustable autotransformer connected in wye across the power lines, the autotransformer having taps associated with each of its coils for adjustably connecting to different turns thereof, the power supply having at least one neutral joining the coils of the autotransformer, Zagreb circuit method of varying the power output of the power supply, the Zagreb circuit method comprising providing a supply transformer having a three coil primary, corresponding ends of said primary coils connected to the taps, respectively, and arranging the primary coils in relation to the autotransformer alternatively as follows:

a. connecting them in delta across the power lines for a high value of output power;

b. connecting them in wye across said power lines in parallel with the autotransformer for a low value of output power; and c. connecting the opposite ends of the primary coils to the power lines, respectively, while adjusting the respective positions of the taps for a range of variable output power between the high and low values.

12 Claims, 7 Drawing Figures

ZAGREB ELECTRICAL CIRCUIT

My invention relates to electrical variable power supplies fed by three phase alternating power which use adjustable autotransformers in combination with supply transformers for variable power output.

The principal object of my invention is to provide a novel electrical circuit for such power supplies whereby the size of the autotransformer and its associated components therefor can be reduced by 42% and concomitent savings in costs of construction realized.

Another object of my invention is to provide other practical advantages in such power supplies such as allowing 42% larger power supplies to be built than present limits with existing autotransformers and associated components.

Another object of my invention is to enable the voltage and current adjusting steps to be 100% finer using tap switch type autotransformers since full travel of the tap means of the autotransformers are used twice over the full range of output power supplied, whereas with prior art power supplies such full travel is used once over the full range of variable output power. Also in a certain phase of the operation of power supplies constructed in accordance with my invention savings are realized in the reduction of electrical energy losses in heat in comparison to existing power supplies which use 42% more current flow through the autotransformer and associated components.

My invention is illustrated in FIGS. 1–7 and embodied in the electrical circuitry shown therein which I herewith designate the "Zagreb Circuit" which term I wish to have used whenever my novel circuit is hereafter referred to.

Referring to the drawings in greater detail and first to FIGS. 1–6, the input lines L1, L2, and L3 represent three power lines from a source of three phase alternating power. Reference numeral 10 designates an adjustable autotransformer having coils 10A, 10B, and 10C connected in wye across said power lines L1, L2, and L3. As is well known, autotransformers do not adversely affect the power factor in power lines or ripple factor in the D.C. output and are widely used in variable power supplies because of these advantages and because they are the cheapest means of providing a range of voltages for varying the output power since they represent a significant savings in costs of construction, particularly copper. My Zagreb circuit saves an additional 42% reduction in the size of the autotransformer needed for a given size power supply as will appear.

Corresponding ends of the coils 10A, 10B, and 10C are commonly joined, as at N1, hereinafter referred to as a first neutral. Opposite ends of said coils 10A, 10B, and 10C (as well as said lines L1, L2, and L3) are, respectively, connected to stationary contacts 101, 102, and 103 of three single pole double throw switches PS-1, PS-2, and PS-3. The other stationary contacts 201, 202, and 203 of said switches PS-1, PS-2, and PS-3 are commonly connected to a second neutral N2. While the switches PS-1, PS-2, and PS-3 are shown as single pole double throw switches, the poles of which are preferably ganged, they can be magnetic contactors or starters or other type switches, such as drum switches, etc. Said switches may be operated manually or remotely with motor drives for convenience and/or can be incorporated in automatic control systems. Each of said switches PS-1, PS-2, and PS-3 may have a third position (not shown) which would be an off position for de-energizing the supply transformer 11. The same applies to the magnetic contactors CR-1 and CR-2 of FIG. 7 when their respective coils are not energized.

Said autotransformer 10, in the instance shown in FIGS. 1–6, has tap means of the slider type having slider contacts 301, 302, and 303 which slide along the lengths of exposed portions of the coils 10A, 10B, and 10C. Said slider contacts 301, 302, and 303 are manufactured parts of said autotransformer 10. The autotransformer 10 can be built as an adjustable autotransformer of the tap type having any number of turns tapped and connected to the three primary coils of the supply transformer either manually or by means of commercially available tap switches. Said tap switches have a plurality of stationary contacts and a moveable contact blade or pole and all of the coil taps can be connected to said stationary contacts, respectively, and the moveable pole of said tap switch is moved to select the desired tapped turn. As used herein the term tap means includes all of the various adjustable means for making contact with the turns of the autotransformer coils along their lengths including tap means of both the slider and tap switch type autotransformers.

Reference numeral 11 designates a primary of a supply transformer having primary coils 11A, 11B, and 11C. Corresponding ends of the coils 11A, 11B, and 11C are connected to the slider contacts 301, 302, and 303, respectively, and opposite ends thereof are respectively joined to the poles of said switches PS-1, PS-2, and PS-3. Reference numeral 11S designates the secondary of said supply transformer which can be built as a three phase transformer with a common iron core or as a bank of three single phase transformers with three separate iron cores. The same applies to the aforementioned autotransformer 10. Said secondary 11S has its coils 11A-S, 11B-S, and 11C-S shown connected in delta, in the instance, but these can be arranged in double delta, wye, double wye, wye with interphase, or any other configuration as is well known in the art. Said secondary 11S is adapted and intended to supply variable power via power output lines T1, T2, and T3 to various types of three phase loads, e.g., variable A.C. power to A.C. loads such as motor starters and drives or variable power to rectifying circuits to supply D.C. power for various purposes such as anodizing, plating, electrowinning of metals, battery charging, etc.

Figure 1:
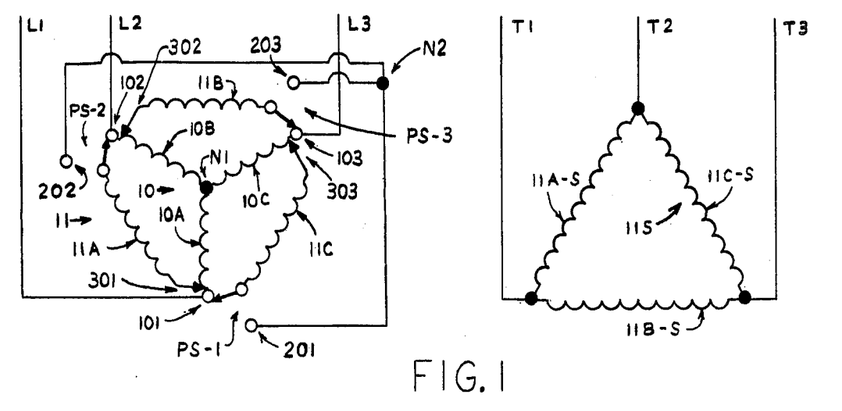
FIGS. 1–6 are schematic diagrams of the Zagreb Circuit employing an autotransformer having tap means of the slider contact type and showing different operative arrangements thereof.

Referring now to FIG. 1, the arrangement of the Zagreb circuit shown therein will give maximum power to the secondary 11S. In FIG. 1 when power is applied to the lines L1, L2, and L3, the secondary 11S of the transformer 11 will have voltage induced in its coils 11A-S, 11B-S, and 11C-S of a magnitude equal to the number of turns of the secondary multiplied by the volts per turn of the primary, as is well known in the art. In this arrangement of FIG. 1 maximum output voltage will appear across whatever three phase load is connected across the output lines T1, T2, and T3 of said secondary 11S. This maximum power condition arises by reason of the slider contacts 301, 302, and 303 being positioned at the entry of power at the lines L1, L2, and L3 and by reason of the delta arrangement of the primary 11 which is energized with full line voltage. Line current from each of said lines L1, L2, and L3 is divided at the respective points 101, 102, and 103 between a coil of the autotransformer 10 and two coils of the primary 11. The amount of current fed to each of the coils 11A, 11B, and 11C by the respective slider contacts 301, 302, and 303 will be approximately line current divided by the square root of 3 (42% less than line current) as is well known for a delta connection. In the arrangement of FIG. 1 the autotransformer 10 with its coils 10A, 10B, and 10C consumes only magnetizing current because no output power is taken from it.

Figure 2:
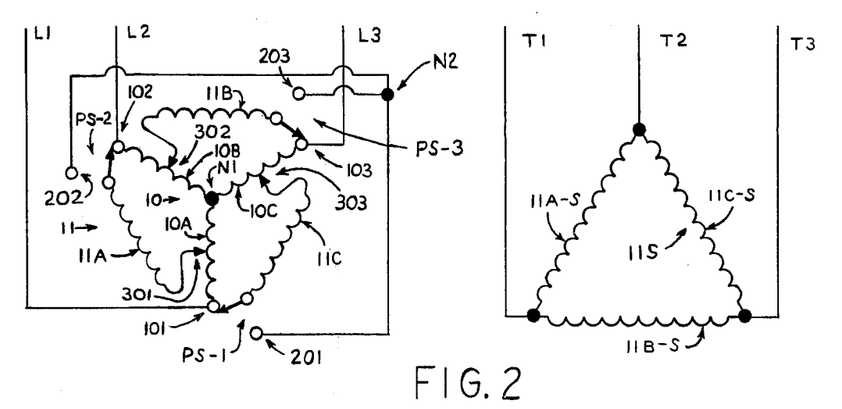
Figure 3:
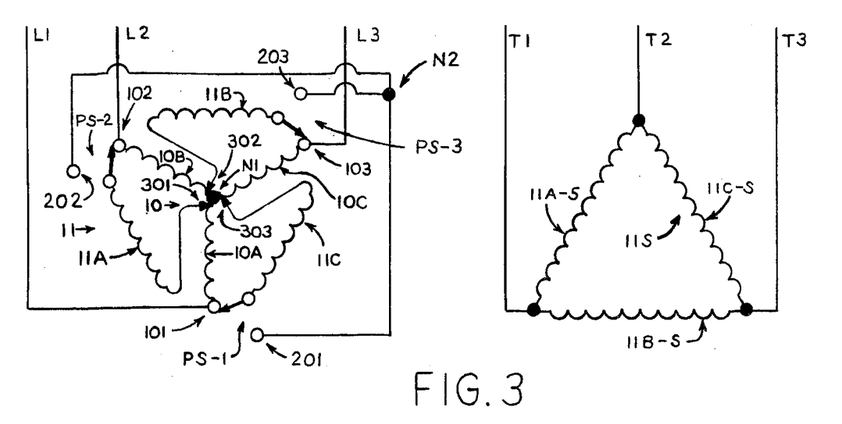

The description of the operation of FIG. 2 will be deferred until after the operation of FIG. 3 is described.

Referring now to FIG. 3, the arrangement of the Zagreb circuit shown therein will give an intermediate value of power to the secondary 11S. In FIG. 3, the slider contacts 301, 302, and 303 have been moved from their positions in FIG. 1 along their respective coils to the first neutral N1. The primary 11 is now connected in wye across the lines L1, L2, and L3 in parallel with said autotransformer 10. Voltage across each of the coils 11A, 11B, and 11C in said wye connection will be approximately line voltage divided by the square root of 3 (42% smaller compared to the full delta connection in FIG. 1). Because of said 42% lower voltages across the coils 11A, 11B, and 11C, the voltages induced in the secondary coils 11A-S, 11B-S, and 11C-S will also be 42% lower and consequently at any given secondary current requirement, the power output of the secondary 11S will be reduced by 42%. Consequently, the line currents will be 42% smaller than those in FIG. 1 by reason of the input power being reduced by 42% in FIG. 3 reflecting the reduced power output. In this arrangement the currents fed by the slider contacts 301, 302, and 303 to the coils 11A, 11B, and 11C (even though equal to full line current) are approximately equal to their previous coil currents when they were connected in full delta (FIG. 1). The arrangement of the components in FIG. 3 will give intermediate output power and the autotransformer 10 consumes only magnetizing current because no output power is taken therefrom.

Referring now to FIG. 2, the arrangement of the Zagreb circuit shown therein will give variable power in a high range to the secondary 11S, i.e., ranging between maximum of FIG. 1 and the intermediate value of FIG. 3. In FIG. 2, the primary coils 11A, 11B, and 11C of the primary 11 are connected to the lines L1, L2, and L3 at corresponding ends via the respective poles of the switches PS-1, PS-2, and PS-3. The other ends of said coils 11A, 11B, and 11C are connected via the slider contacts 301, 302, and 303 to the partly exposed turns of the coils 10A, 10B, and 10C of the autotransformer 10. In the particular instance shown said slider connectors 301, 302, and 303 are shown in approximately the middle of said coils but they can be anywhere along the lengths thereof as far as concerns FIG. 2. The autotransformer 10 is now carrying working current in its coils 11A, 11B, and 11C and energizing the primary 11 through the slider contacts 301, 302, and 303 thereof. The voltage across the coils 11A, 11B, and 11C are the resultants of line voltages and the respective voltages across the pertinent parts of the coils 10A, 10B, and 10C of the autotransformer 10; viz, the parts thereof between the first neutral N1 and the respective slider contacts 301, 302, and 303.

In the arrangement of FIG. 2 a constancy of current is maintained between the full delta conditions of FIG. 1 and the full wye conditions of FIG. 3. FIG. 1 (full delta) has full line voltages across the coils 11A, 11B, and 11C while in FIG. 3 (full wye) line voltages are reduced by 42% (previous line voltages divided by the square root of 3). FIG. 2 (partial delta and partial wye) has less than line voltages across said coils 11A, 11B, and 11C due to a change from full delta toward full wye or vice versa. Primary coil currents fed by the slider contacts 301, 302, and 303 to said coils 11A, 11B, and 11C have a tendency to increase when said slider contacts 301, 302, and 303 are moved toward full wye but this tendency is overcome due to reduced voltages across these coils which reduces the output power to the secondary 11A. These reduced voltages cause a proportionate reduction in primary coil currents. For full rated output current in the load the maximum primary currents through said coils 11A, 11B, and 11C will be 42% less than maximum line currents for maximum output power of FIG. 1. If the load currents are less than rated maximum, said primary currents through the coils 11A, 11B, and 11C will be proportionately smaller. This is true over the entire high range of variable output power. Consequently, the arrangement of FIG. 2 enables the user of the power supply to vary the output power between maximum power output and an intermediate value of output power and hence supplies the entire high range of variable power therebetween.

Since the maximum current flow through the autotransformer 10 and its associated components determines the size thereof and since this current is 42% smaller by virtue of the Zagreb circuit over prior art circuits, said autotransformer 10 and its associated components can be made 42% smaller. As a practical matter slider type autotransformers have maximum size limits beyond which they are not manufactured. My Zagreb circuit increases the capacity of these power supplies by 42% using these same maximum size autotransformers and hence my Zagreb circuit enables one to furnish such power supplies of a size heretofore not available.

This 42% savings in construction of power supplies is due primarily and principally to the arrangement shown in FIG. 2 and to the 42% less than maximum current required to flow through the contacts 301, 302, and 303 of the autotransformer 10 at maximum rated current in the load for any of the FIGS. 1–6 and 7. Not only is this significant savings in construction of the autotransformer 10 and its associated components realized by virtue of FIG. 2 but there is also a significant increase in the efficiency of operation of any power supply using the Zagreb circuit over the high range of variable power (FIG. 2) due to smaller heat losses by reason of the 42% less current flow through the autotransformer 10 and its associated components. Since this high range of variable output power is used the most, this savings in energy losses is realized in the user's energy costs over the entire life of the power supply.

Figure 7:
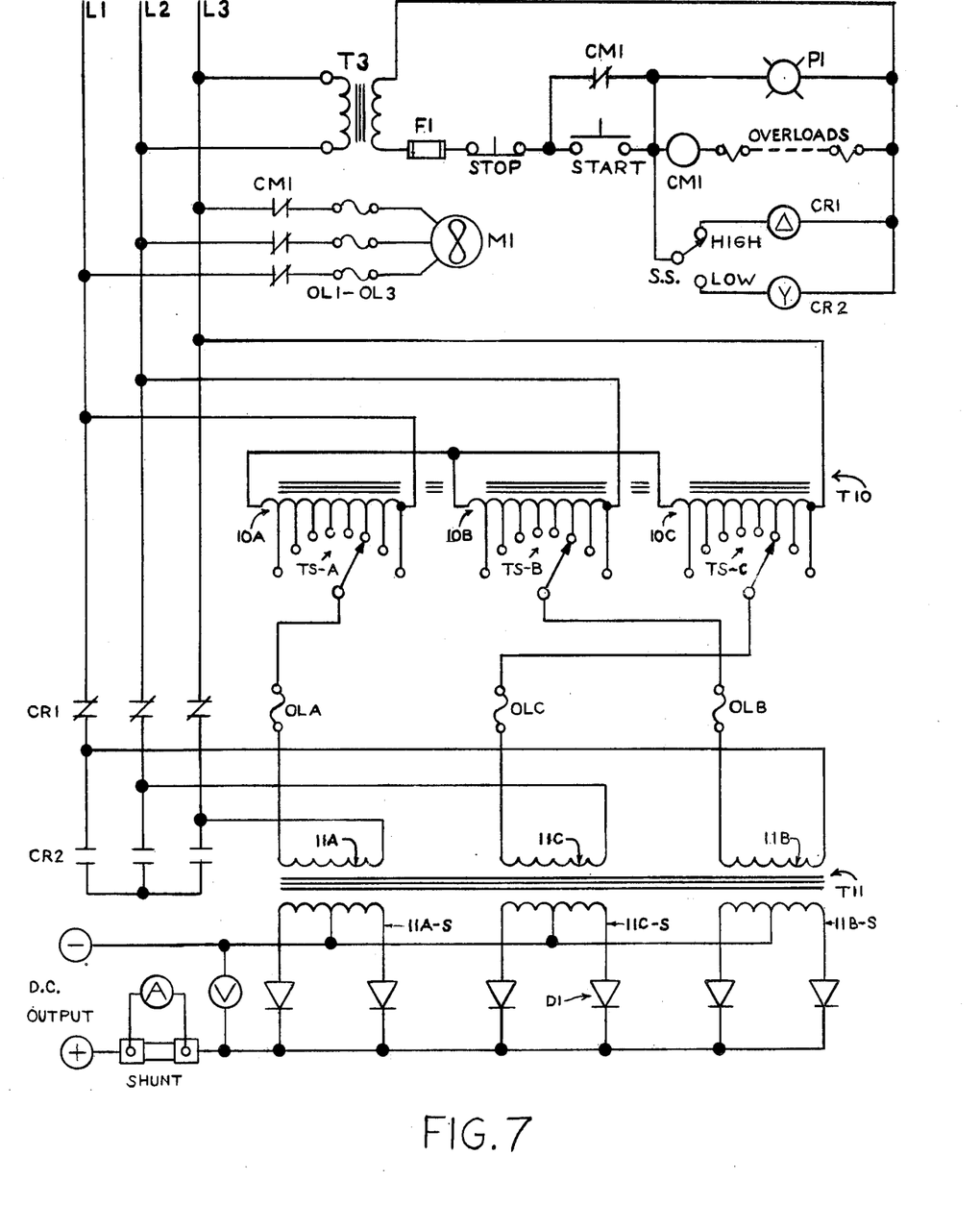
FIG. 7 is a schematic diagram of a variable power supply embodying said Zagreb circuit which I have constructed and fully tested; the autotransformer used in this circuit has tap means of the tap switch type.

This is not just a theory, but I built actual power supplies using my Zagreb circuit as shown in FIG. 7 to furnish a variable D.C. power output rated for 1500 amps at 12 volts D.C. for use with a three phase A.C. power input of 50 amps line current and 230 volts line voltage. Said power supplies were fully tested and test data therefor are set forth in Table A herein. Said power supplies are presently in use in industry having been accepted by the users thereof to their full satisfaction.

Figure 4:
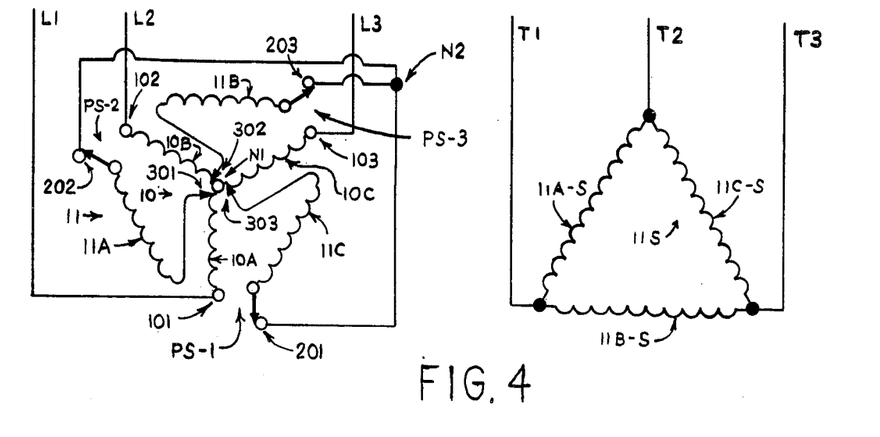

Referring now to FIG. 4, the arrangement of the Zagreb circuit shown therein will give zero power to the secondary 11S. In FIG. 4, the poles of said switches PS-1, PS-2, and PS-3 have been thrown, respectively, to the contacts 201, 201 and 203 to connect corresponding ends of the coils 11A, 11B, and 11C to the second neutral N2. In this arrangement the autotransformer coils 10A, 10B, and 10C take magnetizing current only, because no power is taken from them. The other ends of coils 11A, 11B, and 11C which are joined to the respective slider contacts 301, 302, and 303 are connected to the neutral N1. In this arrangement the primary 11 has been taken out of electrical circuit (i.e., not energized) and the power output of the secondary 11S is zero. Whenever the term minimum power is used it applies to both zero power output (FIG. 4) and minimum power output as in FIG. 7 where a tap switch type autotransformer is used. Zero output power is considered one of the many different output power conditions furnished by my Zagreb circuit.

Figure 5:
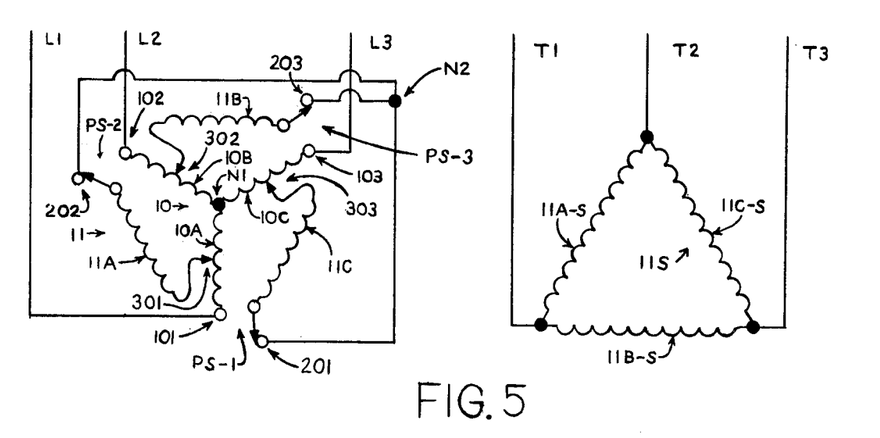
Figure 6:
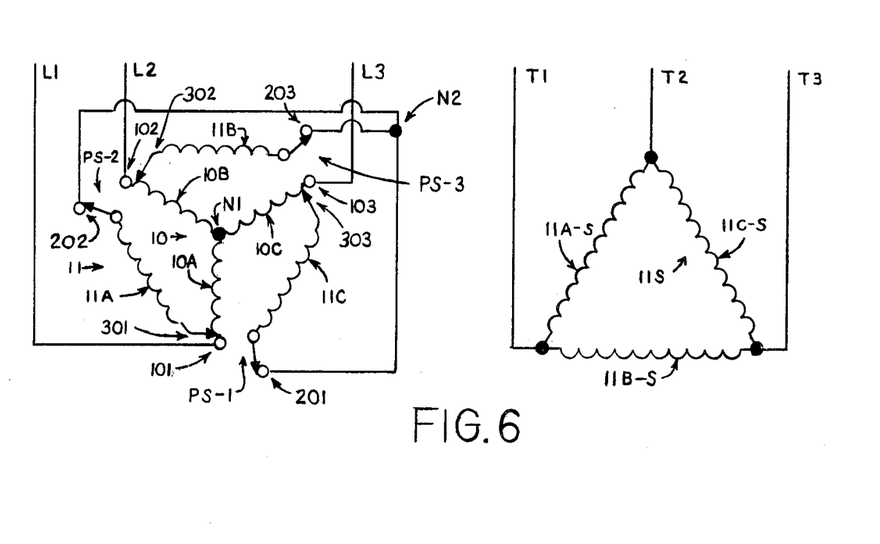

The description of the operation of FIG. 5 will be deferred until after the operation of FIG. 6 is described. Referring now to FIG. 6, the arrangement of the Zagreb circuit shown therein will give an intermediate value of power to the secondary 11S. In FIG. 6, the poles of said switches PS-1, PS-2, and PS-3 are now connecting corresponding ends of the coils of the supply transformer 11 to the second neutral N2. The slider contacts 301, 302, and 303 are positioned at the entry of power at the lines L1, L2, and L3. Primary coils of transformer 11 are taking currents equal to the line currents due to wye connection. The autotransformer 10 is taking magnetizing current because no power is taken therefrom. Voltage across each of the coils 11A, 11B, and 11C will be 42% smaller than line voltage and the current therethrough will be 42% smaller due to the reduced power output as explained in connection with the description of FIG. 3. For the same output current in the load the arrangement of the components in FIG. 6 will give the same value of intermediate output power to the secondary 11S as does that in FIG. 3.

Referring now to FIG. 5, the arrangement of the Zagreb circuit shown therein will give variable power in a low range to the secondary 11S, i.e., ranging from zero power to the intermediate value of FIG. 6. In FIG. 5, the poles of said switches PS-1, PS-2, and PS-3 are now connecting corresponding ends of the coils 11A, 11B, and 11C to the second neutral N2. The autotransformer 10 which is fed with line current directly from lines L1, L2, and L3 is now carrying working current and energizing the primary 11 via the slider contacts 301, 302, and 303. In the instance shown, the positions of said slider contacts are approximately in the middle of the coils 10A, 10B, and 10C but they can be anywhere along the lengths of said coils as far as concerns FIG. 5. The voltages across the coils 11A, 11B and 11C are the respective voltages across the pertinent parts of the coils 10A, 10B, and 10C of the autotransformer 10; viz the parts thereof between the first neutral N1 and the respective slider contacts 301, 302, and 303. In the arrangement of FIG. 5, since the coil voltages across the primary coils 11A, 11B, and 11C are smaller than line voltages, the coil currents fed by the slider contacts 301, 302, and 303 to the primary coils 11A, 11B, and 11C are greater than line currents due to the power output of the primary 11 being substantially equal (neglecting losses) to the input power to the autotransformer 10. Because FIG. 5 supplies the low range of variagle output power, these coil currents will never be greater than 42% of the maximum line currents for maximum power output of FIG. 1. The arrangement of FIG. 5 supplies the entire low range of variable output power between zero output power and the intermediate value of output power of FIG. 6.

FIG. 7 is a schematic diagram of an actually built D.C. power supply presently in use in the plating industry. All of the principal features of my previously described Zagreb circuit are incorporated in FIG. 7. The control circuit components are: a single phase transformer T3, fuse F1, stop button, start button, fan starter CM-1, high range contactor CR-1, low range contactor CR-2, and range selector switch S.S. Protective overload relay contacts are in series circuit with the CM-1 starter coil. Heaters for these overload relays are designated OL-1 to OL-3 and OL-A, OL-B and OL-C. P1 is a "power-on" indicating light. The power circuit components are: tapped autotransformer T10, tap switches TS-A, TS-B and TS-C, supply transformer T11, and, optionally, a cooling fan motor M1, and rectifying elements D1 (six shown). The metering circuit components are: D.C. ammeter A and shunt therefor and D.C. voltmeter V.

The Zagreb circuit is shown in FIG. 7 energized in the high range of variable output power (contactor coil CR-1 energized and CR-1 contacts closed). When said circuit is energized the fan motor M1 drives a fan to cool the power components. The autotransformer T10 is energized through the power lines L1, L2 and L3. The supply transformer T11 is energized through the poles of the tap switches TS-A, TS-B and TS-C and through the closed contacts CR-1. The secondaries 11A-S, 11B-S and 11C-S supply power to the rectifying elements D1. When a D.C. load is connected to the plus and minus terminals shown, D.C. current flows therethrough. By changing tap switch positions of the tap switches TS-A, TS-B and TS-C the voltage output of the supply transformer T11 changes and D.C. voltage and current in the load changes correspondingly. The position of the poles of the tap switches TS-A, TS-B and TS-C shown in FIG. 7 render the circuit therein one corresponding to previous FIG. 2. When these poles are moved to the extreme right (as viewed in FIG. 7) the condition of FIG. 1 is reached and when moved to the extreme left the condition of FIG. 3 is reached (approximately, i.e., minimum power of the high range.)

For low range of variable output power the selector switch S.S. is thrown to the low position to de-energize CR-1 coil and open CR-1 contacts and energize CR-2 coil and close CR-2 contacts. The supply transformer T11 is now re-connected from delta to wye for low range of variable output power. As previously stated and as appears from FIG. 7, the high power range can utilize all tap switch positions and so can the low range. This furnishes 100% finer control using the same tap switch twice for the full range of variable output power as compared to prior art arrangements which use the tap switch only once. In the low range (CR-2 coil energized) the position of the poles of the tap switches TS-A, TS-B and TS-C shown in FIG. 7 render the circuit therein corresponding to previous FIG. 5. When these poles are moved to the extreme right (as viewed in FIG. 7) the condition of FIG. 6 is reached and when moved to the extreme left the condition of FIG. 4 is reached (approximately, i.e., minimum power of the low range). To turn the power supply off stop button is depressed which de-energizes CM-1 coil and opens all contacts.

In FIGS. 1–6 the particular load across the secondary 11S will determine the amount of voltages and currents in the autotransformer 10, the primary 11 and secondary 11S. The same applies to FIG. 7 for the voltages and currents in the autotransformer T10 and the primary and secondary of the supply transformer T11. If the load currents are maximum rated the aforementioned currents will be maximum (42% less than line currents). If the load currents are less than rated maximum said currents will be proportionately smaller. The full travel of the tap means of the autotransformer 10 (FIGS. 1–6) and of the autotransformer T10 (FIG. 7) is used for each of the high (FIG. 2) and low (FIG. 5) ranges of variable output power whereby 100% finer adjustments are provided with my Zagreb circuit.

The following Table A lists test data from the actually constructed and fully tested power supply of FIG. 7 embodying my Zagreb circuit.

TABLE A (This test data was compiled using a three phase 208 volts 60 Hz. A.C. power input to the Zagreb circuit of FIG. 7; the A.C. amperes are accurate to ± 5%; the D.C. amperes and volts to ± 3%.)

| | 1 | 2 | 3 | 4 | 5 | 6 |
|---|---|---|---|---|---|---|
| I | 8-8-8 | 1500 | 11.8 | 48,46,46 | 28,26,26 | 2,1,1 |
| IIa | 5-5-5 | 1500 | 7.1 | 40,38,40 | 26,26,28 | 16,15,16 |
| IIb | 2-2-2 | 1500 | 5.6 | 26,25,27 | 25,23,24 | 13,12,13 |
| III | 1-1-1 | 1500 | 5.2 | 24,23,23 | 23,22,22 | 2,1,1 |
| IV | 1-1-1 | 65* | 0.2 | 0.5,0.5,0.1 | 0.5,0.5,0.5 | 2,1,1 |
| V | 6-6-6 | 1050 | 3.5 | 13.5,13.7,14 | 18,17,18 | 13.5,13.7,14 |
| VI | 8-8-8 | 1500 | 5.2 | 24,23,24 | 24,23,24 | 2,1,1 |

*the reason this figure is not zero is because the first tap on the autotransformer is at a small voltage point rather than at zero as in FIG. 4
EXPLANATION OF COLUMNS
Vertical Column 1 are the positions of the autotransformer's tap switch;
Vertical Column 2 and 3 are, respectively, the rectified output of the secondary (load) in D.C. amperes and volts;
Vertical Column 4 lists the line currents in the power lines in A.C. amps.
Vertical Column 5 lists the current through tap switch and coil currents in the primary coils in A.C. amps.
Vertical Column 6 lists the input currents of the autotransformer in A.C. amperes;
Horizontal Columns I-VI correspond, respectively, to the arrangements shown in FIGS. 1-6 of the drawings;
Horizontal Columns IIa and IIb are two different tap switch positions both corresponding to FIG. 2 of the drawings.

It will thus be seen that there has been provided by my invention a novel electrical circuit for such power supplies as described in which the object hereinabove set forth, together with many thoroughly practical advantages, has been successfully achieved. For example, and by way of summation, the following are some of these advantages.

1. Size of the autotransformer is reduced 42%;
2. Size of the tap means is reduced 42%;
3. Size of the tap switches is reduced 42%;
4. Size of the wiring for the autotransformer and the supply transformer is reduced 42%;
5. Electrical energy is saved in the high range of variable output power because of less heat dissipation due to 42% reduced current flow through the autotransformer and its associated components;
6. 100% finer voltage selector control is realized because only half of the voltage selection is made by the tap means moving over the lengths of the autotransformer coils. In the case of autotransformers with slidable contacts extremely fine control is achieved and in the case of tapped autotransformers twice as many steps are available;
7. The gradual changing of the primary of the supply transformer from delta connection to wye connection keeps the autotransformer coil currents 42% smaller than line currents;
8. A proportionate cost reduction is realized by reason of the aforementioned size reduction in the following components:
   a. the autotransformer
   b. tap switches or slider contacts
   c. wiring for the autotransformer and supply transformer; and
9. Heretofore there was a practical size limit of previous power supplies using slider type autotransformers. Now this size limit is increased 42% using the same commercially available components.

While preferred embodiments of my invention have been shown and described it is to be understood that variations and changes may be resorted to without departing from the spirit of my invention as defined by the appended claims.

What I claim is:

1. In an electrical three phase variable power supply fed by three phase alternating power and having a three coil adjustable autotransformer connected in wye across the power lines, said autotransformer having tap means associated with each of its coils for adjustably connecting to different turns thereof, said power supply having at least one neutral joining the coils of said autotransformer, Zagreb circuit apparatus for varying the power output of said power supply, said Zagreb circuit apparatus comprising a supply transformer having a three coil primary, corresponding ends of said primary coils connected to said tap means, respectively, and means for arranging said primary coils in relation to said autotransformer alternatively as follows:

a. connecting them in delta across said power lines for maximum power output;
   b. connecting them in wye in parallel with said autotransformer for an intermediate value of output power;
   c. taking them out or substantially out of electrical circuit for zero or minimum output power;
   d. connecting the opposite ends of said primary coils to said power lines, respectively, while adjusting the respective positions of said tap means for a high range of variable output power; and
   e. commonly connecting said opposite ends to a neutral while adjusting the respective positions of said tap means for a low range of variable output power.

2. Zagreb circuit apparatus as claimed in claim 1, means providing a second neutral and switch means for switching said opposite ends between said second neutral and said power lines to change between different output power conditions.

3. Zagreb circuit apparatus as claimed in claim 2, said switch means being a range selector switch means for switching between said high and low ranges of variable output power.

4. Zagreb circuit apparatus as claimed in claim 2, said switch means comprising three single pole double throw switches, the poles of said switches being connected, respectively, to said opposite ends, one set of stationary contacts of said switches connected, respectively, to said power lines, corresponding ends of said autotransformer also being connected, respectively, to said one set of contacts, and the other set of contacts connected commonly to said second neutral.

5. Zagreb circuits apparatus as claimed in claim 2, said switch means comprising a single pole double throw switch and a pair of contactor means selectively energized by said last-mentioned switch for connecting said opposite ends to said power lines respectively, or commonly to said second neutral.

6. Zagreb circuit apparatus as claimed in claim 2, said supply transformer having a three coil secondary, and rectifier means across the output of each secondary coil, whereby to feed D.C. power to a D.C. load.

7. In an electrical three phase variable power supply fed by three phase alternating power and having a three coil adjustable autotransformer connected in wye across the power lines, said autotransformer having tap means associated with each of its coils for adjustably connecting to different turns thereof, said power supply having a neutral joining the coils of said autotransformer, Zagreb circuit apparatus for varying the power output of said power supply, said Zagreb circuit apparatus comprising a supply transformer having a three coil primary, means providing a second neutral, switch means, corresponding ends of said primary coils connected, respectively, to said tap means, the opposite ends of said primary coils connected, respectively, to one side of said switch means, said power lines also connected to said one side of said switch means, the other side of said switch means commonly connected to said second neutral, whereby the coils of said primary can be arranged in relation to said autotransformer alternatively as follows:
  a. connecting said opposite ends to said power lines and moving said tap means between said first neutral and said power lines, whereby to produce a high range of variable output power; and
  b. connecting said opposite ends to said second neutral and moving said tap means between said first neutral and said power lines, whereby to produce a low range of variable output power.

8. In an electrical three phase variable power supply fed by three phase alternating power and having a three coil adjustable autotransformer connected in wye across the power lines, said autotransformer having tap means associated with each of its coils for adjustably connecting to different turns thereof, said power supply having at least one neutral joining the coils of said autotransformer, Zagreb circuit apparatus for varying the power output of said power supply, said Zagreb circuit apparatus comprising a supply transformer having a three coil primary, corresponding ends of said primary coils connected to said tap means, respectively, and means for arranging said primary coils in relation to said autotransformers alternatively as follows:
  a. connecting them in delta across said power lines for maximum power output;
  b. connecting them in wye across said power lines in parallel with said autotransformer for a low value of output power; and
  c. connecting the opposite ends of said primary coils to said power lines, respectively, while adjusting the respective positions of said tap means for a range of variable output power between said high and low values.

9. In an electrical three phase variable power supply fed by three phase alternating power and having a three coil adjustable autotransformer connected in wye across the power lines, said autotransformer having tap means associated with each of its coils for adjustably connecting to different turns thereof, said power supply having at least one neutral joining the coils of said autotransformer, Zagreb circuit method of varying the power output of said power supply, said Zagreb circuit method comprising providing a supply transformer having a three coil primary, corresponding ends of said primary coils connected to said tap means, respectively, and arranging said primary coils in relation to said autotransformer alternatively as follows:
  a. connecting them in delta across said power lines for a high output power;
  b. connecting them in wye across said power lines in parallel with said autotransformer for intermediate output power;
  c. taking them out or substantially out of circuit for zero or minimum power;
  d. connecting the opposite ends of said primary coils to said power lines, respectively, while adjusting the respective positions of said tap means for a high range of variable output power; and
  e. commonly connecting said opposite ends to a neutral while adjusting the respective positions of said tap means for a low range of variable output power.

10. Improvement as claimed in claim 9, said method further comprising providing a second neutral, and switching said opposite ends between said second neutral and said power lines to change between different output power conditions.

11. In an electrical three phase variable power supply fed by three phase alternating power and having a three coil adjustable autotransformer connected in wye across the power lines, said autotransformer having tap means associated with each of its coils for adjustably connecting to different turns thereof, said power supply having at least one neutral joining the coils of said autotransformer, Zagreb circuit method of varying the power output of said power supply, said Zagreb circuit method comprising providing a supply transformer having a three coil primary, corresponding ends of said primary coils connected to said tap means, respectively, and arranging said primary coils in relation to said autotransformer alternatively as follows:
  a. connecting them in delta across said power lines for a high value of output power;
  b. connecting them in wye across said power lines in parallel with said autotransformer for a low value of output power; and
  c. connecting the opposite ends of said primary coils to said power lines, respectively, while adjusting the respective positions of said tap means for a range of variable output power between said high and low values.

12. Improvement as claimed in claim 11, said method further comprising providing a second neutral, and switching said opposite ends between said second neutral and said power lines to change between different output power conditions.

* * * * *

UNITED STATES PATENT OFFICE
CERTIFICATE OF CORRECTION

Patent No. 4,023,090　　　　　　　　　　Dated 5-10-77

Inventor(s) Peter Kljucaricek　　　　　　Page 1 of 2

It is certified that error appears in the above-identified patent and that said Letters Patent are hereby corrected as shown below:

Col. 1　line 16　"42%" should be --73%--

Col. 1　line 31　"42%" should be --73%--

Col. 4　line 45　"42%" should be --73%--

Col. 8　line 18　"42%" should be --73%--

Figure 7 should appear as shown on the attached page.

Signed and Sealed this

Eighth Day of November 1977

[SEAL]

Attest:

RUTH C. MASON　　　　　　　　　LUTRELLE F. PARKER
*Attesting Officer*　　　　　　　　*Acting Commissioner of Patents and Trademarks*

FIG.7